(12) United States Patent
Begin et al.

(10) Patent No.: US 8,991,176 B2
(45) Date of Patent: Mar. 31, 2015

(54) FLUID DRIVE MECHANISM FOR TURBOCHARGER

(75) Inventors: Louis P. Begin, Rochester, MI (US); Carnell E. Williams, Southfield, MI (US)

(73) Assignee: GM Global Technology Operations LLC, Detroit, MI (US)

(*) Notice: Subject to any disclaimer, the term of this patent is extended or adjusted under 35 U.S.C. 154(b) by 468 days.

(21) Appl. No.: 13/432,501

(22) Filed: Mar. 28, 2012

(65) Prior Publication Data

US 2013/0255253 A1    Oct. 3, 2013

(51) Int. Cl.
| | |
|---|---|
| *F02B 33/44* | (2006.01) |
| *F01D 25/16* | (2006.01) |
| *F04D 29/38* | (2006.01) |
| *F04D 29/44* | (2006.01) |
| *F01M 9/00* | (2006.01) |
| *F01D 25/18* | (2006.01) |
| *F16N 7/36* | (2006.01) |
| *F04B 17/00* | (2006.01) |
| *F02B 37/10* | (2006.01) |
| *F02B 39/08* | (2006.01) |
| *F02B 63/00* | (2006.01) |
| *F01M 1/02* | (2006.01) |
| *F02B 37/14* | (2006.01) |

(52) U.S. Cl.
CPC ............... *F02B 37/10* (2013.01); *F02B 39/08* (2013.01); *F02B 63/00* (2013.01); *F01M 1/02* (2013.01); *F02B 37/14* (2013.01); *F05B 2220/40* (2013.01); *Y02T 10/144* (2013.01)
USPC ......... 60/605.3; 60/605.1; 417/407; 415/115; 415/170.1; 415/208.1; 415/110; 415/212.1; 184/6.3; 184/6.11; 184/6.18

(58) Field of Classification Search
CPC .......... F02B 37/10; F02B 39/08; F02B 63/00; F02B 37/14; F01M 1/02; F01M 2001/0215; F01M 2011/021; F05B 2220/40; Y02T 10/144
USPC .............. 60/605.3, 605.1, 608; 417/406–407, 417/223; 415/110, 112, 115, 167, 168.4, 415/170.1, 208.1, 212.1; 184/6.11, 6.3, 184/6.18; 384/464
See application file for complete search history.

(56) References Cited

U.S. PATENT DOCUMENTS

| | | | | |
|---|---|---|---|---|
| 2,283,176 | A | * | 5/1942 | Birmann ................. 417/406 |
| 2,448,824 | A | * | 9/1948 | Price ...................... 417/223 |
| 2,651,553 | A | * | 9/1953 | Simonis et al. ......... 184/6.11 |

(Continued)

FOREIGN PATENT DOCUMENTS

CN            1851247 A      10/2006

*Primary Examiner* — Thai Ba Trieu
(74) *Attorney, Agent, or Firm* — Quinn Law Group, PLLC

(57) ABSTRACT

A turbocharger for an internal combustion engine includes a shaft, a first turbine wheel, a compressor wheel, and a second turbine wheel. The shaft includes a first end and a second end and is supported for rotation about an axis. The first turbine wheel is mounted on the shaft proximate to the first end and configured to be rotated about the axis by post-combustion gasses emitted by the engine. The compressor wheel is mounted on the shaft between the first and second ends and configured to pressurize an airflow being received from the ambient for delivery to the engine. The second turbine wheel is mounted on the shaft proximate to the second end and configured to be rotated about the axis by a pressurized fluid. An internal combustion engine employing such a turbocharger is also disclosed.

14 Claims, 2 Drawing Sheets

(56) References Cited

U.S. PATENT DOCUMENTS

| | | | | |
|---|---|---|---|---|
| 2,717,118 A | * | 9/1955 | Hellmuth | 415/168.4 |
| 2,842,306 A | * | 7/1958 | Buchi | 417/247 |
| 2,968,914 A | * | 1/1961 | Birmann | 60/608 |
| 3,057,436 A | * | 10/1962 | Jacobson et al. | 184/6.3 |
| 3,096,615 A | * | 7/1963 | Zuhn | 60/606 |
| 3,143,103 A | * | 8/1964 | Zuhn | 60/599 |
| 3,364,866 A | * | 1/1968 | Sato | 384/122 |
| 3,428,242 A | * | 2/1969 | Rannenberg | 415/180 |
| 3,834,156 A | * | 9/1974 | Cutler et al. | 417/407 |
| 4,010,613 A | * | 3/1977 | McInerney | 60/599 |
| 4,183,714 A | * | 1/1980 | Gosling | 415/112 |
| 4,285,200 A | | 8/1981 | Byrne et al. | |
| 4,370,106 A | * | 1/1983 | Lauterbach | 417/407 |
| 4,376,617 A | * | 3/1983 | Okano et al. | 417/407 |
| 4,422,295 A | * | 12/1983 | Minami et al. | 60/605.3 |
| 4,444,014 A | | 4/1984 | Kobayashi | |
| 4,619,590 A | * | 10/1986 | Johnson | 417/407 |
| 4,930,460 A | * | 6/1990 | Aihara et al. | 123/41.49 |
| 5,000,143 A | * | 3/1991 | Brown | 184/6.18 |
| 5,025,629 A | * | 6/1991 | Woollenweber | 60/602 |
| 5,113,658 A | | 5/1992 | Kobayashi | |
| RE34,276 E | * | 6/1993 | Glaser et al. | 417/407 |
| 5,494,012 A | * | 2/1996 | Hagen | 184/6.3 |
| 5,713,201 A | * | 2/1998 | Sakemi | 415/167 |
| 5,906,805 A | | 5/1999 | Chang et al. | |
| 6,457,311 B2 | * | 10/2002 | Fledersbacher et al. | 60/605.3 |
| 8,172,525 B2 | * | 5/2012 | Fukami | 415/212.1 |
| 8,393,152 B2 | * | 3/2013 | Nishida | 60/605.3 |
| 8,544,268 B2 | * | 10/2013 | Begin | 60/605.1 |
| 2003/0059294 A1 | * | 3/2003 | Olsen | 415/110 |
| 2007/0033939 A1 | * | 2/2007 | Wang et al. | 60/612 |
| 2010/0143111 A1 | * | 6/2010 | Kuehnel | 415/208.1 |
| 2010/0175377 A1 | * | 7/2010 | Hippen et al. | 60/602 |
| 2011/0011380 A1 | * | 1/2011 | Lagerlof et al. | 123/573 |
| 2012/0308366 A1 | * | 12/2012 | Petitjean | 415/170.1 |
| 2012/0328418 A1 | * | 12/2012 | Yang et al. | 415/170.1 |
| 2013/0136579 A1 | * | 5/2013 | Koch et al. | 415/115 |
| 2014/0271128 A1 | * | 9/2014 | John et al. | 415/111 |

* cited by examiner

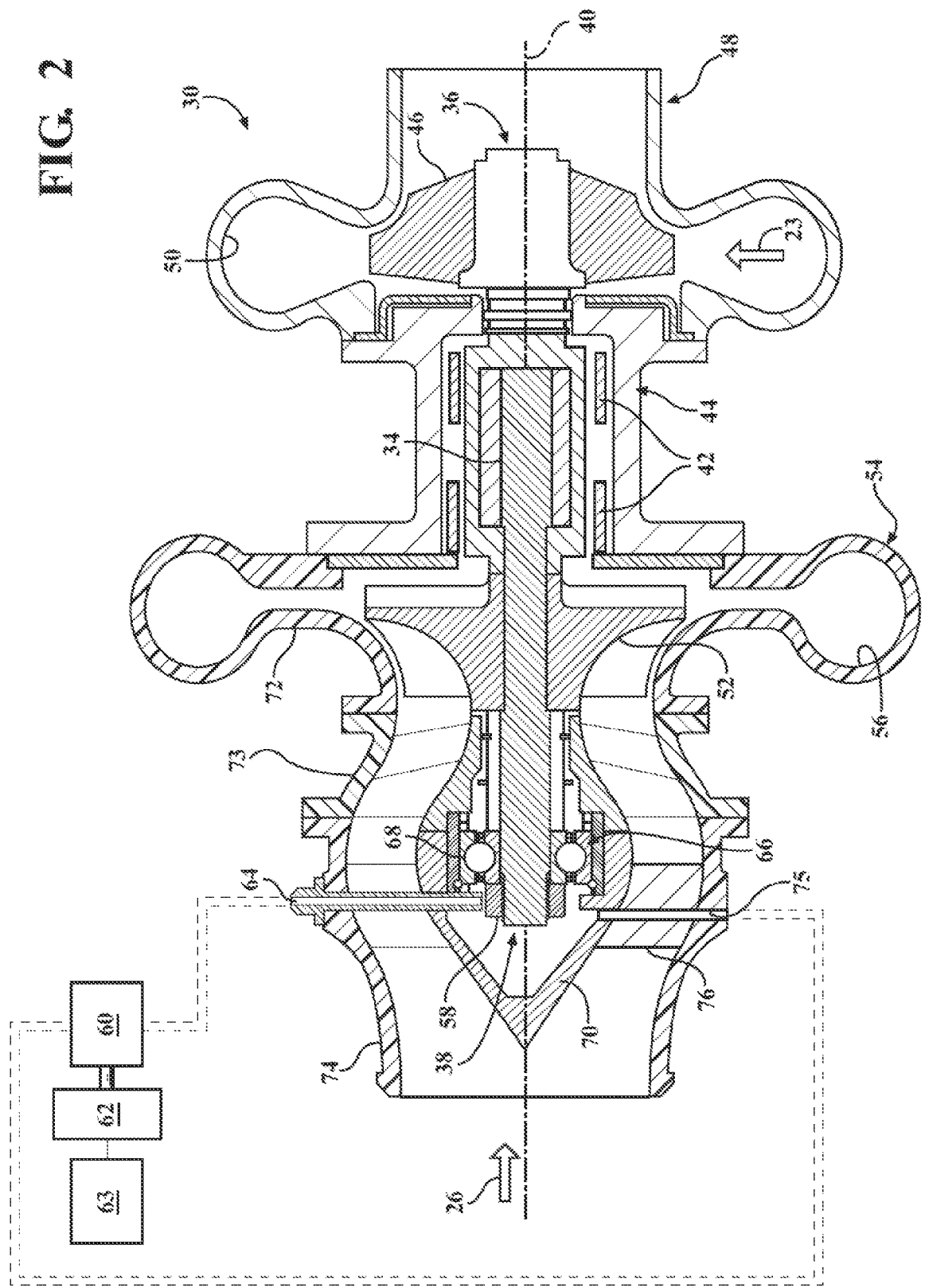

US 8,991,176 B2

FLUID DRIVE MECHANISM FOR TURBOCHARGER

TECHNICAL FIELD

The present disclosure relates to a fluid drive mechanism for a turbocharger of the type used to boost performance of internal combustion engines.

BACKGROUND

Internal combustion engines (ICE) are often called upon to generate considerable levels of power for prolonged periods of time on a dependable basis. Many such ICE assemblies employ a boosting device, such as an exhaust gas turbine driven turbocharger, to compress the airflow before it enters the intake manifold of the engine in order to increase power and efficiency.

Specifically, a turbocharger is a centrifugal gas compressor that forces more air and, thus, more oxygen into the combustion chambers of the ICE than is otherwise achievable with ambient atmospheric pressure. The additional mass of oxygen-containing air that is forced into the ICE improves the engine's volumetric efficiency, allowing it to burn more fuel in a given cycle, and thereby produce more power.

SUMMARY

One embodiment of the disclosure is directed to a turbocharger for an internal combustion engine that includes a shaft, a first turbine wheel, a compressor wheel, and a second turbine wheel. The shaft includes a first end and a second end and is supported for rotation about an axis. The first turbine wheel is mounted on the shaft proximate to the first end and configured to be rotated about the axis by post-combustion gasses emitted by the engine. The compressor wheel is mounted on the shaft between the first and second ends and configured to pressurize an airflow being received from the ambient for delivery to the engine. The second turbine wheel is mounted on the shaft proximate to the second end and configured to be rotated about the axis by a pressurized fluid.

The engine may include an oil pump, and in such a case the pressurized fluid is engine oil supplied by the oil pump. The oil pump may be driven mechanically by the engine or by an electric motor.

The shaft may be supported by at least one bearing. Furthermore, the engine oil may be directed to lubricate such a bearing subsequent to having rotated the second turbine wheel. The subject bearing may include a plurality of rolling elements, such as balls.

The turbocharger may additionally include a compressor cover having a volute configured to direct to the compressor the airflow being received from the ambient. The turbocharger may also include a bearing housing configured to retain the at least one bearing. Furthermore, the bearing housing may be fixed to the compressor cover.

The turbocharger may additionally include a plurality of struts configured to support the bearing housing relative to the compressor cover. The struts may be spaced at unequal intervals around the axis.

The turbocharger may additionally include a nozzle in fluid communication with the oil pump, being affixed to the bearing housing, and configured to direct the engine oil to the second turbine wheel.

Another embodiment of the invention is directed to an internal combustion engine having the turbocharger described above.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a schematic cross-sectional view of the turbocharger shown in FIG. 1.

DETAILED DESCRIPTION

Figure 1:
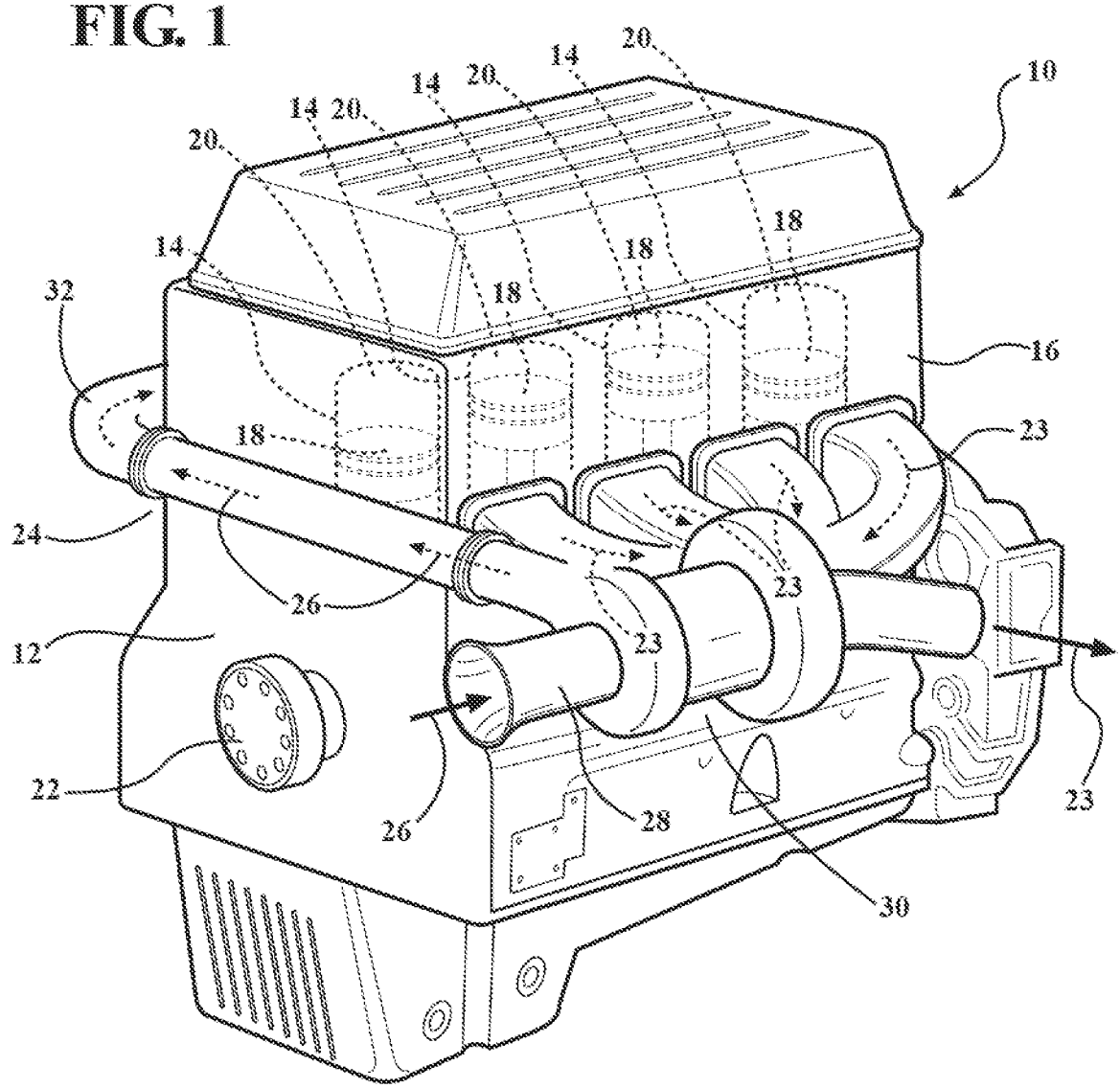
FIG. 1 is a schematic perspective view of an engine with a turbocharger according to the disclosure.

Referring to the drawings wherein like reference numbers correspond to like or similar components throughout the several figures, FIG. 1 illustrates an internal combustion engine 10. The engine 10 also includes a cylinder block 12 with a plurality of cylinders 14 arranged therein. As shown, the engine 10 also includes a cylinder head 16. Each cylinder 14 includes a piston 18 configured to reciprocate therein.

Combustion chambers 20 are formed within the cylinders 14 between the bottom surface of the cylinder head 16 and the tops of the pistons 18. As known by those skilled in the art, combustion chambers 20 are configured to receive a fuel-air mixture for subsequent combustion therein. The engine 10 also includes a crankshaft 22 configured to rotate within the cylinder block 12. The crankshaft 22 is rotated by the pistons 18 as a result of an appropriately proportioned fuel-air mixture being burned in the combustion chambers 20. After the air-fuel mixture is burned inside a specific combustion chamber 20, the reciprocating motion of a particular piston 18 serves to exhaust post-combustion gases 23 from the respective cylinder 14.

The engine 10 also includes an induction system 24 configured to channel airflow 26 from the ambient to the cylinders 14. The induction system 24 includes an intake air duct 28, a turbocharger 30, and an intake manifold 32. Although not shown, the induction system 24 may additionally include an air filter upstream of the turbocharger 30 for removing foreign particles and other airborne debris from the airflow 26. The intake air duct 28 is configured to channel the airflow 26 from the ambient to the turbocharger 28, while the turbocharger is configured to pressurize the received airflow, and discharge the pressurized airflow to the intake manifold 32. The intake manifold 32 in turn distributes the previously pressurized airflow 26 to the cylinders 14 for mixing with an appropriate amount of fuel and subsequent combustion of the resultant fuel-air mixture.

As shown in FIG. 2, the turbocharger 30 includes a shaft 34 having a first end 36 and a second end 38. The shaft 34 is supported for rotation about an axis 40 via bearings 42 and 66. The bearings 42 are mounted in a bearing housing 44 and may be lubricated by a supply of oil. The bearings 42 may be journal-, ball-, air foil, or magnetic-type. A rolling element, such as a ball-type bearing provides a reduced coefficient of friction as compared to a bearing having two flat surfaces that rotate relative to one another, such as in a journal bearing. Accordingly, the shaft 34 being supported by ball bearings would rotate more freely than its journal bearing supported counterpart, and through reduced frictional losses would enhance the response of the turbocharger 30 during operation thereof.

A first turbine wheel 46 is mounted on the shaft 34 proximate to the first end 36 and configured to be rotated about the axis 40 by post-combustion gasses 23 emitted from the cylinders 14. The first turbine wheel 46 is disposed inside a turbine housing 48 that includes a volute or scroll 50. The scroll 50 receives the post-combustion exhaust gases 23 and directs the exhaust gases to the turbine wheel 46. The scroll 50 is configured to achieve specific performance characteristics, such as efficiency and response, of the turbocharger 30.

The turbocharger 30 also includes a compressor wheel 52 mounted on the shaft 34 between the first and second ends 36, 38. The compressor wheel 52 is configured to pressurize the airflow 26 being received from the ambient for eventual delivery to the cylinders 14. The compressor wheel 52 is disposed inside a compressor cover 54 that includes a volute or scroll 56. The scroll 56 receives the airflow 26 from the compressor wheel 52 after the airflow has been compressed. The scroll 56 is configured to achieve specific performance characteristics, such as peak airflow and efficiency of the turbocharger 30. Accordingly, rotation is imparted to the shaft 34 by the post-combustion exhaust gases 23 energizing the first turbine wheel 46, and is in turn communicated to the compressor wheel 52 owing to the compressor wheel being fixed on the shaft. As understood by those skilled in the art, the variable flow and force of the post-combustion exhaust gases 23 influences the amount of boost pressure that may be generated by the compressor wheel 52 throughout the operating range of the engine 10.

With continued reference to FIG. 2, the turbocharger 30 also includes a second turbine wheel 58. The second turbine wheel 58 is mounted on the shaft 34 proximate to the second end 38 and configured to be rotated about the axis 40 by a pressurized fluid. The pressurized fluid may be engine oil that is supplied by an oil pump 60. The oil pump 60 may be of the type that is driven mechanically by the engine 10, or may be driven by an electric motor 62 that is regulated by an electronic controller 63. A separate nozzle 64 may be provided that is in fluid communication with the oil pump 60. The nozzle 64 is employed to direct the engine oil to the second turbine wheel 58 to thereby affect rotation thereof. The motive force imparted to the shaft 34 via the pressurized engine oil supplied through the nozzle 64 would spin up the compressor wheel 52 to assist the rotation generated by the first turbine wheel 46 and thereby decrease the response time of the turbocharger 30.

The second end of the shaft 34 is supported by the bearing 66. The bearing 66 may include a plurality of rolling elements, such as balls 68. A ball-type bearing 66 may be employed for the capability of such bearing configuration to withstand significant thrust, which is usually the result of the forces acting on the turbine and compressor wheels 46, 52 while the turbocharger 30 is generating boost. The turbocharger 30 additionally includes a bearing housing 70. The bearing housing 70 is configured to retain the bearing 66 and also enclose the second turbine wheel 58. The engine oil supplied by the oil pump 60 may be directed to the bearing 66 subsequent to the oil having rotated the second turbine wheel 58 in order to lubricate and cool the bearing. As shown, the bearing housing 70 is disposed in the path of the airflow 26. Accordingly, as shown, the bearing housing 70 may include an aerodynamically favorable shape in order to optimize and direct the airflow 26, further enhancing efficiency of the compressor side of the turbocharger 30.

As shown in FIG. 2, the nozzle 64 may be inserted through and mounted to the compressor cover 54, which may be assembled from multiple components. Such multiple components may include a component 72 that incorporates the scroll 56, a mid-housing 73 containing possible variable guide-vanes for the incoming airflow 26, and a component 74 that provides an inlet for the airflow 26 into the turbocharger 30. Furthermore, the nozzle 64 may be affixed to the component 74 of the bearing housing 70. The nozzle 64 is configured to direct the engine oil to the second turbine wheel 58 and thereby affect rotation thereof. A discharge passage 75 may additionally be provided to remove excess oil from the bearing housing 70 following the lubrication of the bearing 66. The discharge passage 75 is in fluid communication with the oil pump 60 in order to return the engine oil thereto.

As additionally depicted in FIG. 2, the compressor cover 54 includes a plurality of struts 76 configured to support the bearing housing 70 relative to the compressor cover. Accordingly, the bearing housing 70 may be fixed to the compressor cover 54 via the struts 76. There may be three or more struts 76 included in the compressor cover 54 to affect reliable support of the bearing housing 70. Additionally, the nozzle 64 may be inserted through one of the struts 76. The struts 76 may be spaced at unequal intervals around the axis 40. Such unequal spacing of the struts 76 may be provided to reduce the likelihood of a pulsating, standing wave being established in the airflow 26. As understood by those skilled in the art, such a standing wave otherwise established in the airflow 26 may induce a resonance in the compressor wheel 52 and be sufficient to damage the compressor wheel and or the bearing 66.

While the best modes for carrying out the invention have been described in detail, those familiar with the art to which this invention relates will recognize various alternative designs and embodiments for practicing the invention within the scope of the appended claims.

The invention claimed is:

1. A turbocharger for an internal combustion engine having an oil pump configured to supply a pressurized engine oil, the turbocharger comprising:
   a shaft having a first end and a second end, the shaft being supported for rotation about an axis by at least one bearing;
   a first turbine wheel mounted on the shaft proximate to the first end and configured to be rotated about the axis by post-combustion gasses emitted by the engine;
   a compressor wheel mounted on the shaft between the first and second ends and configured to pressurize an airflow being received from the ambient for delivery to the engine; and
   a second turbine wheel mounted on the shaft proximate to the second end and configured to be rotated about the axis by the pressurized engine oil, wherein the engine oil is directed to lubricate the at least one bearing subsequent to having rotated the second turbine wheel.

2. The turbocharger of claim 1, wherein the oil pump is driven mechanically by the engine.

3. The turbocharger of claim 1, wherein the oil pump is driven by an electric motor.

4. The turbocharger of claim 1, wherein the at least one bearing includes a plurality of rolling elements.

5. The turbocharger of claim 1, wherein the turbocharger additionally includes a compressor cover having a volute configured to direct to the compressor the airflow being received from the ambient and a bearing housing configured to retain the at least one bearing, and wherein the bearing housing is fixed to the compressor cover.

6. The turbocharger of claim 5, further comprising a plurality of struts configured to support the bearing housing relative to the compressor cover.

7. The turbocharger of claim 5, further comprising a nozzle in fluid communication with the oil pump, being affixed to the bearing housing, and configured to direct the engine oil to the second turbine wheel.

8. An internal combustion engine comprising:
a cylinder configured to receive an air-fuel mixture for combustion therein;
a reciprocating piston disposed inside the cylinder and configured to exhaust post-combustion gasses from the cylinder;
an oil pump configured to supply a pressurized engine oil; and
a turbocharger including:
- a shaft having a first end and a second end, the shaft being supported by at least one bearing for rotation about an axis;
- a first turbine wheel mounted on the shaft proximate to the first end and configured to be rotated about the axis by the post-combustion gasses;
- a compressor wheel mounted on the shaft between the first and second ends and configured to pressurize an airflow being received from the ambient for delivery to the cylinder; and
- a second turbine wheel mounted on the shaft proximate to the second end and configured to be rotated about the axis by the pressurized engine oil, wherein the engine oil is directed to lubricate the at least one bearing subsequent to having rotated the second turbine wheel.

9. The engine of claim 8, wherein the oil pump is driven mechanically by the engine.

10. The engine of claim 8, wherein the oil pump is driven by an electric motor.

11. The engine of claim 8, wherein the at least one bearing includes a plurality of rolling elements.

12. The engine of claim 8, wherein the turbocharger additionally includes a compressor cover having a volute configured to direct to the compressor the airflow being received from the ambient and a bearing housing configured to retain the at least one bearing, and wherein the bearing housing is fixed to the compressor cover.

13. The engine of claim 12, further comprising a plurality of struts configured to support the bearing housing relative to the compressor cover.

14. The engine of claim 12, wherein the turbocharger additionally includes a nozzle in fluid communication with the oil pump, being affixed to the bearing housing, and configured to direct the engine oil to the second turbine wheel.

* * * * *